Patented Feb. 27, 1951

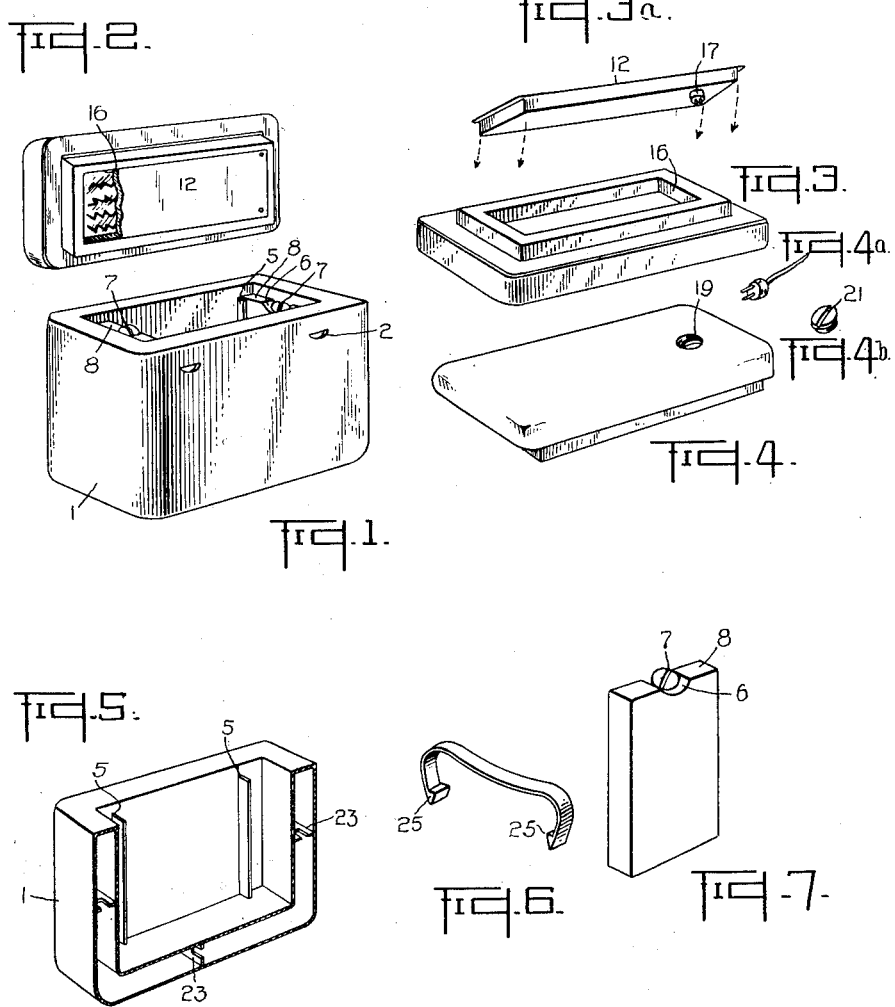

2,543,524

UNITED STATES PATENT OFFICE 2,543,524

ISOTHERMAL FOOD AND LIQUID CARRIER

Gervasio Pinto de Oliveira, Rio de Janeiro, Brazil

Application September 8, 1948, Serial No. 48,277
In Brazil April 5, 1948

1 Claim. (Cl. 219—19)

This invention consists of a new type of isothermal food and liquid carrier, presenting externally the appearance of a traveling case, portmanteau or the like.

This new type of carrier serves for transporting both solid and liquid food under the most rigorous hygienic conditions and in an easy and agreeable manner, for use by school children, students, workmen, office employees and all those who have to carry their food along with them so that they can have their meals hot or cold.

The object of the invention is illustrated in the accompanying drawing in which

Fig. 1 is a perspective view of the food and liquid carrier;

Fig. 2 is an underside view of the cover for the carrier with the heating unit already lodged in the cover;

Figs. 3 and 3a show the cover separate from the heating unit, the latter about to be placed into the former;

Figs. 4, 4a and 4b respectively show the top of the cover with the orifice for receiving either the electric plug of Fig. 4a or the stopper of Fig. 4b;

Fig. 5 is a vertical section of the carrier body to show one way of obtaining thermo-insulation;

Fig. 6 is the clip used to keep the cover firmly on the carrier body; and

Fig. 7 shows in perspective one of the thermogenic receptacles used according to the invention.

As can be seen from the drawing, the invention essentially comprises: an isothermal carrier body having the shape of a rectangular or elongated double-walled box 1 made of metal or other suitable material, the walls being spaced apart by means of insets 23, the space being placed under vacuum or filled with some heat-insulating material or medium such as air so as to provide a suitable insulation for conserving the temperature existing or produced inside the box.

Vertical projections 5 are provided on the inside of the rear and front wall of the box spaced sufficiently from the end walls thereof to permit insertion of thermogenic receptacles or reservoirs 8 (Fig. 7) securely kept in position thereby. The thermogenic receptacles preferably have their closure caps 7 flush with the top surface by means of a recess in the top surface as shown by 6 in Fig. 7.

Externally, the box is provided with depressions or cuts 2 which receive the grips 25 of U-shaped closure springs (Fig. 6) for securing the cover of the carrier box firmly on the latter.

Figs. 2, 3 and 4 show a cover for the carrier box which cover is also properly insulated, having on its underside a cut-out or cavity 16 (Fig. 3) which receives the electric heating unit 12 (Figs. 2 and 3a). On its upper side, near one of the ends thereof, the cover has a circular aperture 19 (Fig. 4), usually closed by a stopper (Fig. 4b) which aperture is also adapted to receive a plug (Fig. 4a) in case the electric heating unit contained in the cover or lid 12 is to be connected with the electric current network.

Fig. 3a shows the heating unit consisting of a resistance of suitable shape and specifications, provided with a thermo-element which permits adjustment of the convenient temperature, the current receiving socket 17 (Fig. 3a) being located in correlation with the orifice in the lid 19 (Fig. 4). By means of the plug (Fig. 4a) the electric connection of the heating unit is made with the local network, or else the stopper is used, which is properly insulated and presents on its top a groove 21 to facilitate insertion and removal.

From the above it is clear how the food and liquid carrier can be used.

Food containers and bottles are placed into the carrier box for which purpose insets, frames, specially shaped containers and bottles may be used to keep these securely positioned. Before or thereafter, the thermogenic receptacles are inserted to fit well within the space between the end walls and the projections or ribs 5 (Figs. 1 and 5).

When hot foodstuffs or beverages are placed into the carrier box, the reservoirs or receptacles are filled with suitable thermogenic means and thus act as heat intensifiers or boosters at each end of the box; when cold foodstuffs or beverages are used, the said reservoirs are filled with some suitable cooling means; this increases the number of respective positive or negative heat units in the isothermal box, thus permitting the preservation of the food or beverage at the desired temperature for a certain length of time.

Independently of the temperature of the food or beverage contained in the isothermal carrier box, the heating unit lodged in the cover of the said box permits warming up the food or beverage to the desired temperature whenever electric current is available.

For this, it is sufficient to remove the stopper which closes the circular orifice existing at one end of the cover 19 (Fig. 4) and to insert instead therein the plug which establishes the connection of the heating unit with the local electrical power network.

This heating unit may also be provided with a thermo-element to permit maintaining the temperature at the desired level and serve at the same time as a means of safety and protection in case one forgets to disconnect it in time.

It is to be noted that while it is shown and described for the invention to provide space for the heating unit in the cover and for the thermogenic receptacles inside box, this does not mean that both must actually be made use of. In point of fact, if the food and beverages lodged in the box are to be kept cold, the thermogenic reservoirs alone will be used; only in case the food and beverages are to be kept hot or to be heated, use may be made of both the thermogenic reservoirs and the heating unit, once current for the latter is available.

It is understood, of course, that minor changes in the size, form and constructions of the various parts of the isothermal food and liquid carrier according to the present invention may be made without departing from the spirit and scope thereof, as set forth in the appended claim.

I claim:

Isothermal food and liquid carrier, comprising in combination a carrier box having double walls, thermo-insulating means separating said double walls, projections on the inside of the rear and front walls spaced from the end walls, a cover also formed with thermo-insulating means intermediate its walls and being provided inside with a cavity, an electric heating unit therein and connectable to an electric current line, receptacles filled with cold or heat producing substances fitting securely into the space between the said projections and the end walls of the box, elastic clamps which hold the cover firmly on the carrier box, and depressions on opposite walls outside the box near its upper edge for receiving said elastic clamps.

GERVASIO PINTO DE OLIVEIRA.

REFERENCES CITED

The following references are of record in the file of this patent:

UNITED STATES PATENTS

| Number | Name | Date |
| --- | --- | --- |
| 1,377,092 | Phaneuf | May 3, 1921 |
| 2,274,285 | Walker | Feb. 24, 1942 |